United States Patent [19]
Ostlinning et al.

[11] Patent Number: 4,762,911
[45] Date of Patent: Aug. 9, 1988

[54] PROCESS FOR THE PREPARATION OF HIGH-MOLECULAR, OPTIONALLY BRANCHED POLYARYLENE SULPHIDE WITH SODIUM SULFIDE, POTASSIUM SULFIDE AND HYDROGEN SULFIDE

[75] Inventors: Edgar Ostlinning, Düsseldorf; Karsten Idel; Ludwig Bottenbruch, both of Krefeld, all of Fed. Rep. of Germany

[73] Assignee: Bayer Aktiengesellschaft, Leverkusen, Fed. Rep. of Germany

[21] Appl. No.: 891,656

[22] Filed: Aug. 1, 1986

[30] Foreign Application Priority Data

Aug. 13, 1985 [DE] Fed. Rep. of Germany ....... 3528977

[51] Int. Cl.$^4$ ............................................. C08G 75/16
[52] U.S. Cl. .................................................... 528/388
[58] Field of Search ......................................... 528/388

[56] References Cited

U.S. PATENT DOCUMENTS

| | | | |
|---|---|---|---|
| 4,282,347 | 8/1981 | Tieszen et al. | 528/388 |
| 4,424,339 | 1/1984 | Idel et al. | 528/388 |
| 4,433,138 | 2/1984 | Idel et al. | 528/388 |

*Primary Examiner*—Harold D. Anderson
*Attorney, Agent, or Firm*—Connolly and Hutz

[57] ABSTRACT

The invention relates to a process for the preparation of high-molecular, optionally branched polyarylene sulphides. These can be prepared without a catalyst in a polar organic solvent by reacting dihalogenoaromatic compounds with mixtures of sodium and potassium sulphides and hydrogensulphides.

5 Claims, No Drawings

PROCESS FOR THE PREPARATION OF HIGH-MOLECULAR, OPTIONALLY BRANCHED POLYARYLENE SULPHIDE WITH SODIUM SULFIDE, POTASSIUM SULFIDE AND HYDROGEN SULFIDE

The invention relates to a process for the preparation of high-molecular, optionally branched polyarylene sulphides. These can be prepared without a catalyst in a polar organic solvent by reacting dihalogenoaromatic compounds with mixtures of sodium and potassium sulphides and hydrogensulphides.

The known processes employ auxiliaries in order to obtain high-molecular polyaryl sulphides. These auxiliaries can be co-solvents, such as dialkylcarboxamides, or catalysts, such as alkali metal carboxylates, salts of polycarboxylic acids, sulphonic acids, halides, phosphates or phosphonates.

As against this, a process has now been found in which a high-molecular, optionally branched polyarylene sulphide can be prepared without auxiliaries or catalysts of this type.

The invention relates to a process for the preparation, without a catalyst or auxiliaries, of optionally branched polyarylene sulphides from (a) 50–100 mol % of dihalogenoaromatic compounds of the formula

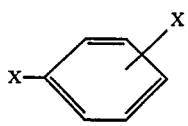

(I)

and 0–50 mol% of dihalogenoaromatic compounds of the formula II

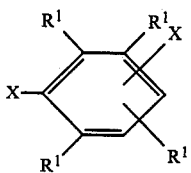

(II)

in which Xs represent halogens, such as chlorine or bromine, in the meta-position or para-position in relation to one another and the $R^1$s are identical or different and can be hydrogen, $C_1$–$C_{20}$-alkyl, $C_5$–$C_{20}$-cycloalkyl, $C_6$–$C_{24}$-aryl, $C_7$–$C_{24}$-alkylaryl or $C_7$–$C_{24}$-arylalkyl, it being possible for two radicals $R^1$ which are in the orthoposition relative to one another to be attached to an aromatic or heterocyclic ring, and a radical $R^1$ is in all cases other than hydrogen, and (b) 0–5 mol %, preferably 0 to 1.25 mol %, relative to the sum of the dihalogenoaromatic compounds of the formula I and II, of a trihalogenoaromatic or tetrahalogenoaromatic compound of the formula $$ArX_n \qquad (III)$$

wherein
Ar is an aromatic or heterocyclic radical,
X represents halogen, such as chlorine or bromine and
n represents the number 3 or 4, and (c) mixtures of sodium and potassium sulphides and hydrogensulphides in (d) a polar organic solvent, characterized in that the mixture of sodium and potassium sulphides and hydrogen-sulphides contains sodium and potassium ions in a ratio from 95 to 5 up to 5 to 95 mol %, preferably 95 to 5 up to 50 to 50 mol %.

The reaction time can be varied within a wide range. It can be from less than 1 hour up to several days, preferably from 1 hour up to 48 hours and particularly preferentially 2 to 18 hours.

The reaction can be carried out continuously or discontinuously.

The reactants can be initially placed together and reacted. Substances containing water can be freed from water separately before the reaction. However, it is also possible for substances containing water to be freed from water by distillation in the reaction mixture before the reaction leading to the polymer. It is also possible to meter in the starting substances in portions or to add them successively to the reaction mixture in any desired sequence.

Meta-dihalogenoaromatic and para-dihalogenoaromatic compounds of the formula (I) or (II) can be employed in accordance with the invention. In this case, the ratio of meta-dihalogenoaromatic compound to para-dihalogenoaromatic compound can be up to 30:70.

It is particularly preferable to employ p-dihalogenoaromatic compounds in order to obtain polyarylene sulphides which can be processed by thermoplastic means.

Sodium sulphide and potassium sulphide can be prepared from hydrogen sulphide and sodium hydroxide or potassium hydroxide.

Sodium ions and potassium ions are present in the reaction solution, in accordance with the invention, in a ratio from 95 to 5 up to 5 to 95 mol %, preferably 95 to 5 up to 50 to 50 mol %, relative to the total amount of sodium and potassium ions.

The molar ratio of sodium to potassium ions according to the invention can be obtained by using either sodium or potassium sulphides or hydrogensulphides. It is also possible, for example, to react sodium hydrogensulphide with potassium hydroxide in an appropriate amount, and vice versa.

Examples of dihalogenoaromatic compounds of the formula (I) to be employed in accordance with the invention are preferably: 1,4-dichlorobenzene, 1,4-dibromobenzene, 1-bromo-4-chlorobenzene, 1,3-dichlorobenzene, 1,3-dibromobenzene and 1-bromo-3-chlorobenzene. They can be used on their own or as a mixture with one another. 1,4-Dichlorobenzene and/or 1,4-dibromobenzene are particularly preferred.

$R^1$ in formula II preferably represents hydrogen, $C_1$–$C_4$-alkyl, $C_5$–$C_{10}$-cycloalkyl, $C_6$–$C_{10}$-aryl, $C_7$–$C_{14}$-alkylaryl or $C_7$–$C_{14}$-aralkyl. It is also possible for two radicals $R^1$ in the ortho-position relative to one another to form a fused aromatic ring having a total of 6 C atoms or a fused heterocyclic ring having 5–6 ring atoms and 1–3 hetero-atoms, such as N, O or S.

The following are examples of dihalogenoaromatic compounds of the formula (II) to be employed in accordance with the invention: 2,5-dichlorotoluene, 2,5-dichloroxylene, 1,4-dichloro-2-ethylbenzene, 1,4-dibromo-2-ethylbenzene, 1-bromo-4-chloro-2-ethylbenzene, 1,4-dichloro-2,3,5,6-tetramethylbenzene, 1,4-dichloro-2-cyclohexylbenzene, 2,5-dichlorobiphenyl, 2-benzyl-1,4-dichlorobenzene, 2,5-dibromobiphenyl, 2,5-dichloro-4'-methylbiphenyl, 2,5-dibromo-4'-methylbiphenyl, 1,4-dichloro-2-hexylbenzene, 2,4-dichlorotoluene, 2,4-dichloroxylene, 2,4-dibromocumene and 1,3-dichloro-5-cyclohexylbenzene. They can be employed on their own or as a mixture with one another.

Ar preferably represents an aromatic radical having 6–24 C atoms or a heterocyclic radical having 6–24 ring atoms, and particularly preferentially an aromatic radical having 6–10 C atoms or a heterocyclic radical, or can contain up to 3 hetero-atoms, such as N, S and O.

The following are examples of trihalogenoaromatic and tetrahalogenoaromatic compounds of the formula (III) to be employed in accordance with the invention: 1,2,3-trichlorobenzene, 1,2,4-trichlorobenzene, 1,2,4-tribromobenzene, 1,3,5-trichloro-2,4,6-trimethylbenzene, 1,2,3-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

Examples of organic solvents which are suitable in accordance with the invention are lactams, such as N-alkyl lactams, for example N-methylpyrrolidone, N-ethylpyrrolidone, N-methylpiperidone, N-isopropylpyrrolidone, N-methylcarprolactam or N-ethylcaprolactam, or cyclic ureas, such as 1,3-dimethylimidazolidin-2-one, or other polar organic solvents such as 1-methyl-1-oxophospholane.

The boiling point of the solvents should be 200° C. to 280° C.

The polyarylene sulphides prepared in accordance with the invention can be mixed with other polymers, pigments and fillers, for example graphite, metal powders, glass powders, ground quartz, glass fibres and carbon fibres, or the stabilizers or mould release agents which are customary for polyarylene sulphides can be added to them. In general, the melt flow behaviour of polyarylene sulphides is measured as specified in ASTM 1239-70 at 316° C. using a 5 kg weight, and is quoted in g/10 minutes.

At high melt flow values, however, this measurement can cause difficulties by virtue of the high flow rate of the polymer melt.

The melt viscosity of the polymer melt (in Pa.s) at 306° C., as a function of the shear stress (in Pa.s), was therefore determined by means of the Istron rotational viscometer.

In this way the melt viscosity can be determined within a very wide range from $10^{-1}$ to $10^7$ Pa.s. In the Instron rheometer the polymer is melted between a fixed plate and a rotatable cone and the torque of the cone is determined. The melt viscosity, as a function of the shear stress, can be calculated from the torque, the angular velocity and the characteristics of the apparatus. The model 3250 rheometer made by Instron was used; diameter of the cone and of the plate 2 cm.

Immediately after being isolated from the reaction mixture, the polyarylene sulphides according to the invention generally have melt viscosities from $0.1 \times 10^1$ to $5 \times 10^4$ Pa.s, preferably from $0.1 \times 10^2$ to $2.5 \times 10^4$ Pa.s, and good properties in respect of colour.

The polyarylene sulphides can also be analysed by chromatographic methods in order to provide information on molecular weight and molecular weight distribution.

Examples of methods suitable for this purpose are high pressure liquid chromatography (HPLC) or gel permeation chromatography (GPC).

Customary support materials can be used as the stationary phase, for example Li-Chropren ®, Lobar ®, Lichorsorb ®, Lichrosphor ®, Perisorb ®, Hibar ®, Fractogel ®, Fractosil ®, Ultrastyragel ®, Microstyragel ®, Zorbax ®, Bondagel ® and Shodex ®.

Customary solvents can be used as solvents and mobile phaSes. These Should have an adequate solubility for the polymer. For example, 1-chloronaphthalene, biphenyl, N-methylpyrrolidone, N-cyclohexylpyrrolidone, N-methylpiperidone, N-methylcaprolactam, N-methyllaurolactam, sulpholane, N,N'-dimethylimidazolidinone, N,N'-dimethylpiperazinone, hexamethylphosphoric acid triamide, 1-methyl-1-oxophospholane and mixtures thereof are suitable.

Absolute or relative standardizations can be carried out in the chromatographic methods of analysis. Examples of suitable standard substances for relative standardizations are customary polymers, such as, for example, polystyrene, polyethylene, polyethylene terephthalate, polybutylene terephthalate, polyesters, such as purely aromatic polyesters, polycarbonate, polyamides, such as PA6, PA66 and PA11, polysulphones or polyether-sulphones.

The chromatography required for the analytical determination of the molecular weights or molecular weight distribution can be carried out under various pressures from 1 to 10 bar. The chromatographic determination is carried out at a temperature from room temperature up to 250° C.

It is also possible to add substances such as alkali metal halides, alkaline earth metal carboxylates or phosphonium or ammonium compounds in order to improve the accuracy of measurement of the sample to be analysed.

In evaluating the analytical data thus determined, it is possible to quote the weight average molecular weights $M_w$. These are 25,000 to 500,000, preferably 25,000 to 300,000 and particularly preferentially 25,000 to 150,000.

The polyarylene sulphides can be directly processed by extrusion, blow-extrusion, injection moulding or other customary processing techniques to give films, shaped articles or fibres. These can be used in a customary manner, for example as automobile components, mountings, electrical components, for example switches or electronic panels, components which are resistant to chemicals and stable to weathering and equipment such as pump casings and pump impellers, etching bath trays, sealing rings, parts of office machines and telecommunications devices and also household appliances, valves and ballbearing components.

EXAMPLE 1

2210 g of N-methylcaprolactam, an anhydrous mixture of sodium and potassium sulphide and hydrogensulphide, consisting of 11.01 mol of sodium ions and 2.75 mol of potassium ions and 5.92 mol of sulphide ions and 1.92 mol of hydrogenSulphide ions, and 6.4 mol of 1,4-dichlorobenzene are initially placed in a 4 1 three-necked flask equipped with a thermometer, a stirrer and a reflux condenser, and the mixture is heated at reflux temperature for 12 hours, with stirring. A polyarylene sulphide having a melt viscosity of $\eta_m = 250$ Pa.s is obtained in a yield of 96.4%, relative to 1,4-dichlorobenzene.

EXAMPLE 2

2210 g of N-methylcaprolactam and 6.4 mol of 1,4-dichlorobenzene are initially placed in a 4 l flask equipped with a thermometer, a stirrer, a dropping funnel and a distillation column fitted with a distillate separator, and the mixture is heated to approximately 210° C. A solution, in a total of 550 ml of water, of sodium/potassium sulphide and hydrogensulphide similar to that in Example 1 is added dropwise at such a rate that the whole of the water is immediately removed by azeotropic distillation with the 1,4-dichlorobenzene. The water is separated off in the distillate separator; the 1,4-dichlorobenzene is returned to the reaction vessel. The mixture is then heated at reflux temperature for a further 10 hours. A polyarylene sulphide having a melt viscosity of $\eta_m = 195$ Pa.s is obtained in a yield of 95.9%, relative to 1,4-dichlorobenzene.

EXAMPLE 3

As Example 2, but with 13.76 mol of sodium ions and no potassium ions. A polyarylene sulphide having a melt viscosity $\eta_m > 1$ Pa.s is obtained in a yield of 87.1%, relative to 1,4-dichlorobenzene.

EXAMPLE 4

As Example 1, but with 13.76 mol of potassium ions and no sodium ions. A polyarylene sulphide having a melt viscosity $\eta_m > 1$ Pa.s is obtained in a yield of 83.6%, relative to 1,4-dichlorobenzene.

We claim:

1. A process for the preparation of unbranched or branched polyarylene sulphides consisting essentially of reacting
   (a) 50-100 mol % of at least one dihalogenoaromatic compound of the formula

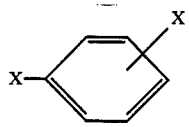     (I)

and 0-50 mol % of at least one dihalogenoaromatic compound of the formula II

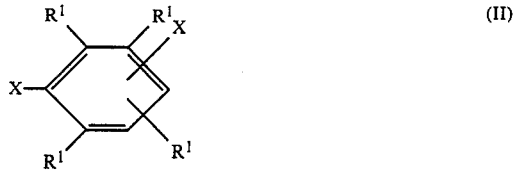

in which X represents halogen, in the meta-position or para-position in relation to one another and each $R^1$ is identical or different to the others and is hydrogen, $C_1$-$C_{20}$-alkyl, $C_5$-$C_{20}$-cycloalkyl, $C_6$-$C_{24}$-aryl, $C_7$-$C_{24}$-arylalkyl, $C_7$-$C_{24}$-alkylaryl, or two $R^1$ moieties which are in the ortho-position relative to one another are attached to an aromatic or heterocyclic ring, with at least one $R^1$ in all cases being other than hydrogen, and (b) 0-5 mol %, relative to the sum of the dihalogenoaromatic compounds of the formula I and II, of a trihalogenoaromatic or tetrahalogenoaromatic compound of the formula $$ArX_n \qquad (III)$$

wherein
Ar is an aromatic or heterocyclic radical,
X represents halogen, and
n represents the number 3 or 4, and (c) a mixture of sodium and potassium sulphide and hydrogen-sulphide in
   (d) a polar organic solvent,
       wherein the mixture of sodium and potassium sulphide and hydrogensulphide contains sodium and potassium ions in a ratio from 95 to 5 up to 5 to 95 mol %.

2. Process according to claim 1, characterized in that the ratio of sodium to potassium ions is 95 to 5 up to 50 to 50 mol %.

3. Process according to claim 1, characterized in that the reaction temperature is 200° to 270° C.

4. Process according to claim 1, characterized in that N-methylcaprolactam is employed as a solvent.

5. Process according to claim 1, characterized in that the reaction is carried out continuously.

* * * * *